US010184218B1

(12) United States Patent
Belloni et al.

(10) Patent No.: US 10,184,218 B1
(45) Date of Patent: Jan. 22, 2019

(54) MARKER LIGHT

(71) Applicants: Mark Belloni, Brewster, OH (US);
James Robert Hartley, Moscow, ID (US)

(72) Inventors: Mark Belloni, Brewster, OH (US);
James Robert Hartley, Moscow, ID (US)

( * ) Notice: Subject to any disclaimer, the term of this patent is extended or adjusted under 35 U.S.C. 154(b) by 0 days.

(21) Appl. No.: 14/300,498

(22) Filed: Jun. 10, 2014

(51) Int. Cl.
*B62D 15/00* (2006.01)
*E01F 9/016* (2006.01)
*B60Q 1/24* (2006.01)
*B62D 15/02* (2006.01)

(52) U.S. Cl.
CPC .............. *E01F 9/0165* (2013.01); *B60Q 1/24* (2013.01); *B62D 15/029* (2013.01)

(58) Field of Classification Search
CPC ....... E01F 9/0165; B60Q 1/24; G01C 15/002; G01C 15/105; B62D 15/029
USPC .......................................... 340/426.36, 932.2
See application file for complete search history.

(56) References Cited

U.S. PATENT DOCUMENTS

| | | | | |
|---|---|---|---|---|
| 4,808,997 | A * | 2/1989 | Barkley | G08G 1/04 250/491.1 |
| 5,864,956 | A * | 2/1999 | Dong | G01B 11/26 33/227 |
| 6,218,962 | B1 * | 4/2001 | Fiene | B60Q 1/48 340/425.5 |
| 6,763,596 | B1 * | 7/2004 | Puri | G01C 15/002 33/227 |
| 7,134,211 | B2 * | 11/2006 | Bascom | G01C 15/002 33/286 |
| 7,218,235 | B1 * | 5/2007 | Rainey | G08B 21/086 340/521 |
| 2002/0075674 | A1 * | 6/2002 | Tufte | B60Q 1/32 362/223 |
| 2004/0212514 | A1 * | 10/2004 | Popps | G08B 7/062 340/691.1 |
| 2005/0099821 | A1 * | 5/2005 | Potter | B60Q 1/48 362/548 |
| 2005/0278966 | A1 * | 12/2005 | Liu | G01C 15/004 33/286 |
| 2006/0023442 | A1 * | 2/2006 | De Los Santos | B60R 25/24 361/814 |
| 2009/0319095 | A1 * | 12/2009 | Cech | B60K 35/00 701/1 |

(Continued)

*Primary Examiner* — Albert K Wong

(57) ABSTRACT

A marker light is a device that provides referential pivoting and precision boundary marking required for parking or docking articulate vehicles during poor visibility conditions. The marker consists of 12 primary features, an upper shell housing, a sealed circular window for white light passage, a sealed slotted window for laser light passage, internal reinforcement, a white up light, a laser beam transform lens, a laser beam source, a rechargeable battery pack, a recharging port, a wiring harness, a lower base plate, and an on/off switch. The up light pinpoints substantially the optimum pivot location during the parking or docking process. The developed laser plane—resulting from the laser beam passing through the transform lens—enables two marking orientations for the driver from one continuous laser impingement curve. From a top view perspective, orientation 1 marks parallel on the ground for aligning the trailer while orientation 2 marks perpendicular to the vertical dock wall.

8 Claims, 11 Drawing Sheets

(56) References Cited

U.S. PATENT DOCUMENTS

| | | | |
|---|---|---|---|
| 2011/0032119 A1* | 2/2011 | Pfeiffer | B60K 35/00 340/905 |
| 2012/0106178 A1* | 5/2012 | Takahashi | B60Q 1/0035 362/459 |
| 2013/0121024 A1* | 5/2013 | Barth | G02B 6/0038 362/607 |
| 2013/0258688 A1* | 10/2013 | Kalapodas | B60Q 1/085 362/465 |
| 2013/0307985 A1* | 11/2013 | Numata | B60R 1/00 348/148 |
| 2014/0168633 A1* | 6/2014 | Guetta | G08B 13/189 356/5.01 |
| 2014/0268837 A1* | 9/2014 | Simchak | B60Q 1/12 362/465 |
| 2015/0070929 A1* | 3/2015 | Weissenberger | F21V 5/045 362/606 |

* cited by examiner

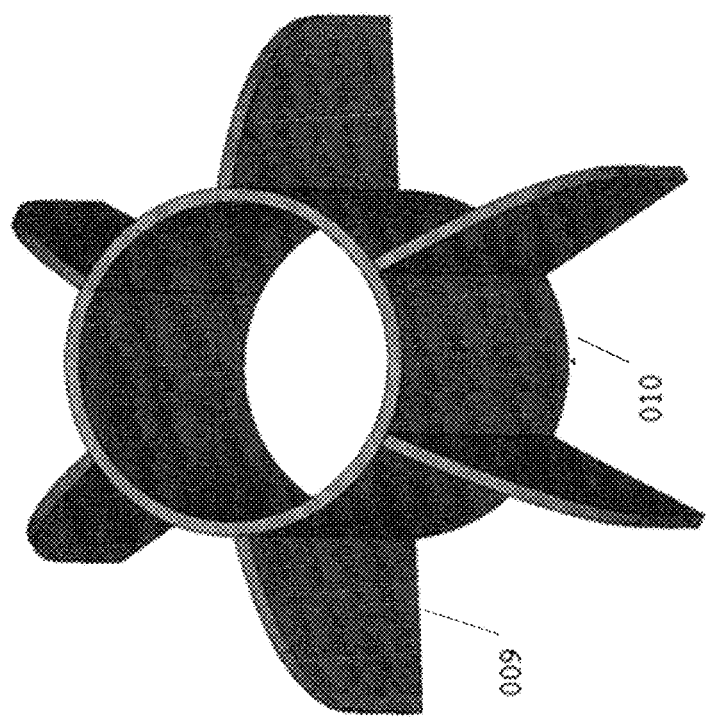

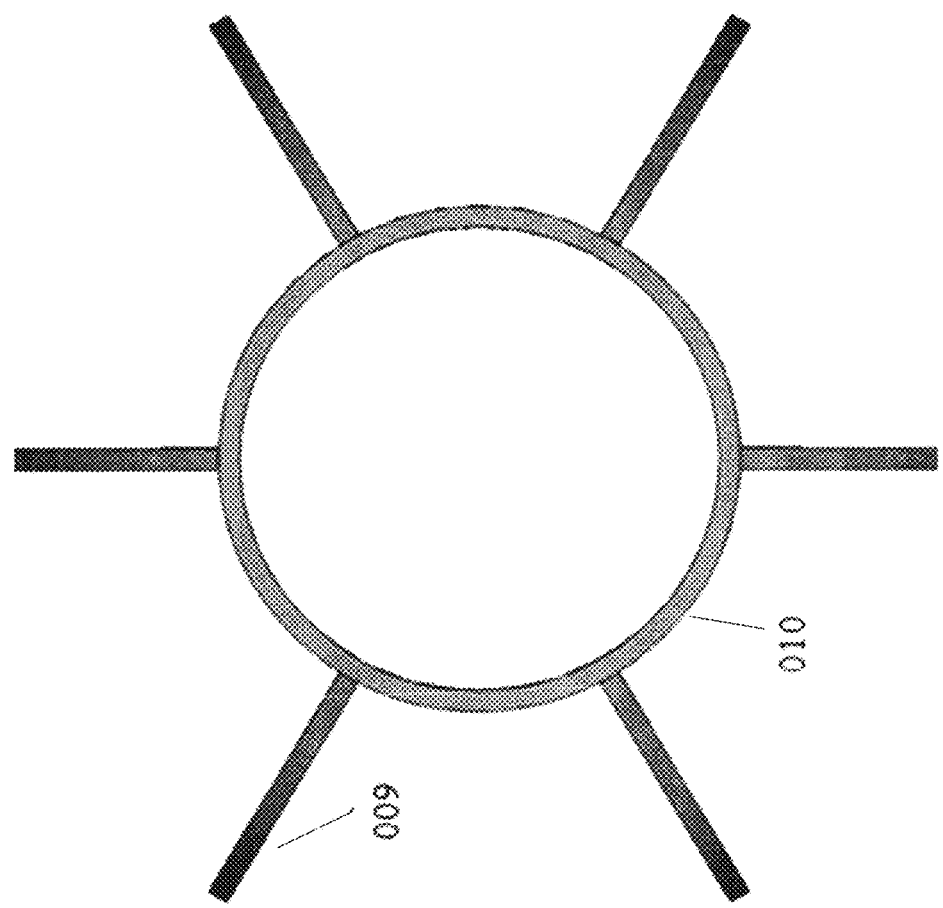

Sketch: NOT TO SCALE

MARKER LIGHT

CROSS REFERENCE FOR RELATED APPLICATIONS

Not Applicable

STATEMENT REGARDING FEDERALLY SPONSORED RESEARCH AND DEVELOPMENT

Not Applicable

FIELD OF INVENTION

The following description relates to a marker light configured to aid in a parking or a docking of a vehicle, including that of a trailer attached to a truck.

PRIOR ART

There exists patented park assist devices which leverage the use of light to aid the driver in parking or docking a vehicle; however, none directly provide the capability to dock or park a semi-tractor trailer. The following patents, most like the present invention, using light as a tool for park assist were found to be expired: U.S. Pat. No. 5,285,205 (White), and U.S. Pat. No. 6,218,962 (Fiene). U.S. Patent Application Publication No. 2012/0133527 (Lin) has been appealed to the Patent Trial and Appeal Board while U.S. Pat. No. 7,891,692 (Reichert er al.) uses a light source in such a way that the patent will not present an infringement concern for the present invention. The above patent citations are generally known to provide park assist systems including the emission of laser lighting or LEDs to aid the driver in parking or docking a vehicle correctly. None of these references found disclose a marker light including a vertical light source configured to emit a light that facilitates a position around which a vehicle should be articulated during the parking process in combination with a laser beam light source configured to emit a laser sheet which defines a planar boundary along which the length of a vehicle should be maneuvered in reverse during proper parallel parking.

BACKGROUND OF THE PRESENT INVENTION

Under some circumstances, a driver of a vehicle may be required to pilot a vehicle into an optimal or a required parking or docking position by maneuvering the vehicle in a reverse direction. The optimal parking or docking of the vehicle may be complicated by a location, a position, or poor visibility conditions in which the driver of the vehicle is required to perform the parking or docking.

For example, when parking or docking the vehicle in poor visibility, the driver of the vehicle may not be able to fully identify a point around which the vehicle should be pivoted in order to achieve optimal parking or docking. In addition, the driver's ability to fully discern a plane along which the vehicle should be piloted for optimal parking or docking may be significantly impaired. As a result, poor visibility may cause the driver of the vehicle to erroneously park or dock the vehicle, thereby increasing an amount of time required to optimally park or dock the vehicle and a likelihood of an occurrence of a parking or docking accident.

The proposed marker light may emit a bright light upward through the top of a dome to pinpoint substantially an optimal location around which a driver should articulate the vehicle during parking or docking. Moreover, this bright up-light emission may be used when docking or parking a vehicle requires a turn in the middle of the docking or parking process; i.e., when an articulate vehicle ideally needs to be articulated around the optimal pivot location to ensure appropriate alignment of the vehicle when parked or docked in the reverse direction.

Additionally, the marker light may emit a laser light through a slot on a side of the dome. The slot of the dome may allow the laser light to be emitted such that a laser sheet or wall is projected along a plane next to which a properly parked or docked vehicle is substantially parallel to the plane formed by the laser sheet. Thus, during the docking or parking process, a driver may be able to successfully park or dock the vehicle around the bright up-light emission and along the developed laser wall during the parking or docking process. Furthermore, if the vehicle interrupts the laser wall during the parking or docking process, laser light from the projected laser sheet will be scattered thereby alerting the driver to an improper parking or docking maneuver prompting the driver to stop. The driver can re-negotiate the next maneuver to correct the current parking angle such that the laser wall is not interrupted, thereby allowing for substantial proper parking or docking of the vehicle.

During times where poor visibility conditions exist, it requires 1 person to provide turning signals the driver in order to secure a proper reverse dock or park of the vehicle. If there is one person only, the driver has to get in and out of the vehicle to understand where and how to negotiate the next maneuver—most likely several times—in order to yield proper parking or docking of a vehicle. This iterative process eventually leads to proper parking or docking of the vehicle.

That said, there is a need for a device that will facilitate efficient docking or parking of a semi-tractor trailer vehicle where only the driver is present in times of poor visibility.

SUMMARY OF THE INVENTION

The present invention is a park assist device that aids in the parking or docking of an articulate vehicle in times of poor visibility conditions where only the driver is present during the maneuver. The device emits both a white up-light and a laser light from the housing device exterior. Both of these light sources illuminate the geometric variables—of sorts—required for proper docking or parking the vehicle These geometric variables are the pivot point and the plane which the vehicle needs to be parallel to, while not passing through, for parking or docking a vehicle properly. The emitting up light substantially marks the point where the driver must pivot around during the docking or parking process. Now the laser light, emitting from the present invention in the form of a developed sheet or nearly planar wall, substantially defines the plane along which the vehicle trailer must approach—in a parallel fashion—when proper parking or docking occurs. To use the present invention: the driver switches it on after substantially charging the battery, places the present invention in an upright position at a location that substantially locates the pivot point for articulating the vehicle around. Then the driver aligns the laser sheet, by rotating the present invention about the imaginary axis defined by the up-light such that the laser plane strikes the ground and vertical dock wall thereby forming an illuminated line that approaches perpendicularity to the dock wall dwelling just to the right of the dock door.

The driver then proceeds to maneuver the vehicle around the pivot point defined by the up-light until the vehicle is parallel to the substantial plane defined by laser sheet. In the event where the driver inadvertently passes the vehicle through the plane defined by the laser sheet, the laser light will scatter sending a signal to the driver to stop immediately the docking or parking process. The driver would adjust the vehicle maneuver and repeat if necessary to the end of which proper docking or parking is achieved. By substantially knowing these geometric variables and exercising them accordingly it is theoretically possible to park or dock the vehicle with one pass without clobbering property outside of the docking well boundary.

BRIEF DESCRIPTION OF THE DRAWINGS

The subject invention, associated features, usage, and enhancement of parking or docking during poor visibility environments may be better understood by referencing the representative images shown in drawings 1 through 9.

DETAILED DISCUSSION OF THE PREFERRED EMBODIMENTS

Examples incorporating one or more aspects of the present invention are described and illustrated in the following drawings. These illustrated examples are not intended to be limiting. For example, one or more aspects of the present invention may be utilized in other embodiments and even other types of devices.

Examples of the present invention may be applicable to a variety of enclosed structures through which one or more lights are emitted, including, but not limited to, flashlights, light pens, laser pens, spotlights, laser trip lights, security systems, and other various illuminations devices and systems with varied alignments light sources, colors, and beam patterns known to those of ordinary skill in the art. However, examples of the present invention may also be part of a larger structure for docking a vehicle, including, but not limited to, a pier, a loading dock, or other similar structures known to those of ordinary skill in the art.

Figure 1:
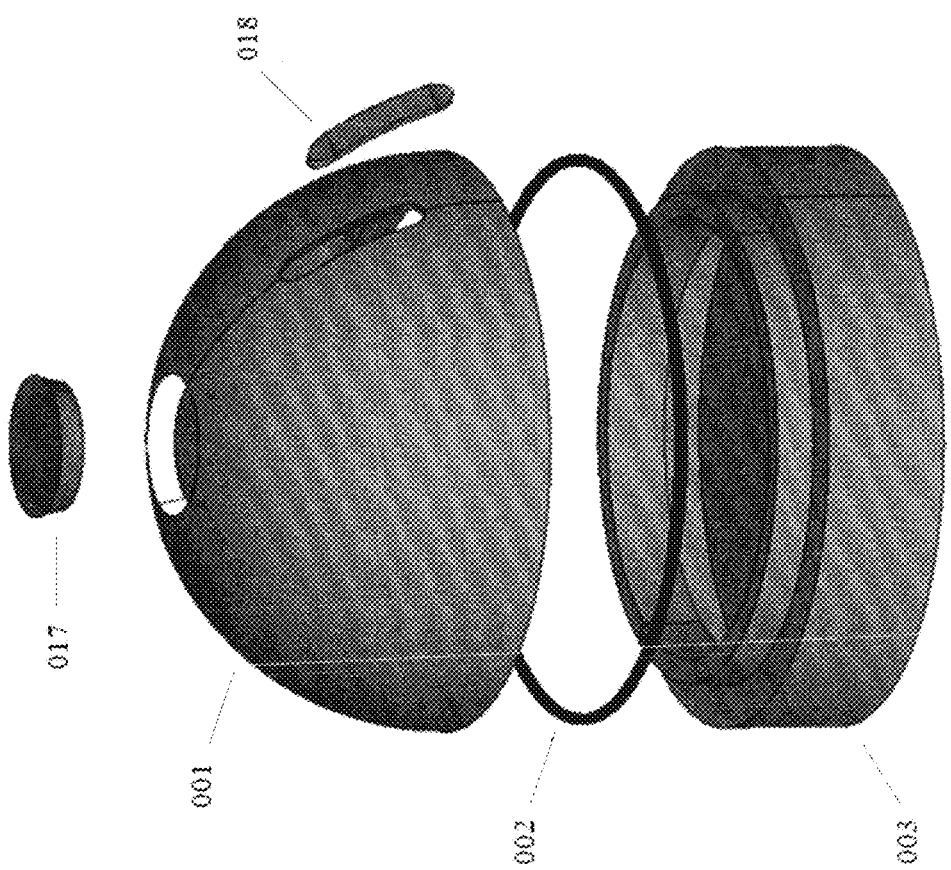
FIG. 1 is an exploded view of the subject invention exterior identifying the upper housing dome, the o-ring, the housing base, and both windows for the white light and laser light passageways.
Figure 2:
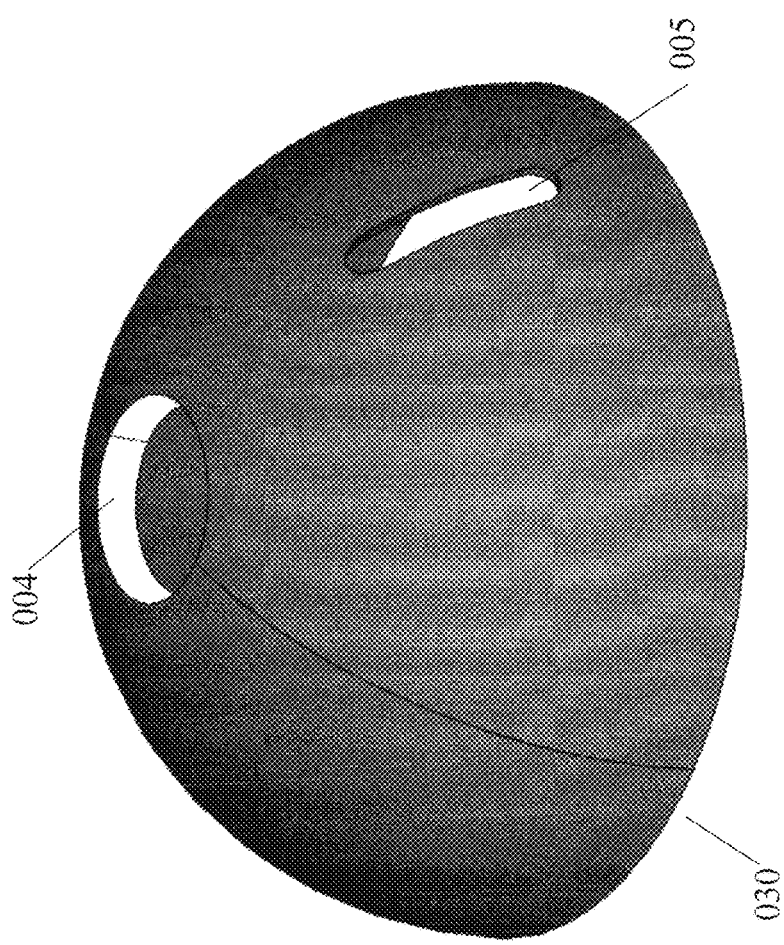
FIG. 2 details the upper dome housing material cutouts that facilitate the up-light and laser plane passage

FIG. 1 is a idealized blow up of the marker light. Representative images of the exterior components that make up the present invention are identified therein. The housing base 003, O-ring 002 sealing the housing base to the upper housing dome, the upper housing dome 001 of substantially hemispherical shape, the sealed translucent substantially circular window 017, and the sealed translucent substantially slotted window 018 are shown. When the present invention is in the operational position, the surface 022 defined by the full circular area found on the exterior surface of the housing base 003 forms an interface with the ground 029 support. The material for the housing dome 001, and the housing base 003 will most likely be cast or machined aluminum. The translucent windows 017 and 018 will most likely be acrylic. The O-ring 002 will most likely be made out of rubber. The ON/OFF switch—not shown—is currently being developed. The ON/OFF is conceived to be attached and sealed to the to the marker housing. The ON/OFF switch most likely will be substantially durable and located diametrically opposite to the slotted cutout [0005]. A port that facilitates the rechargeable battery apparatus—not show—will most likely be attached and sealed to the to the marker housing. This port will most likely be positioned next to the ON/OFF switch FIG. 2 shows the material cutouts for the substantially circular 004 and substantially slotted 005 light passageway features located on the upper housing dome 001. The substantially circular cutout 004 is located at the antipodal point at the uppermost region on the dome housing. Design feature 017 provides for passage of a white light beam generated within the interior of the housing just below feature 017. The long axis of the substantially slotted cutout 018 is coincident with an arc length along the great circle of the hemisphere. This subtended length is a percentage of the length whose endpoints go from the antipode to the equator 030; where the midpoint of this subtended length is substantially towards the equator. The dome may act as a protective shroud surrounding the internal electronics and light apparatus while supporting the sealed translucent windows for emission of the light through the circular window 017 and slot 018. The lighting schemes referenced above in the present invention may also be replaced or adapted into other electro-magnetic or acoustic sensors, sources, and receivers known to one having ordinary skill in the art.

Figure 3:
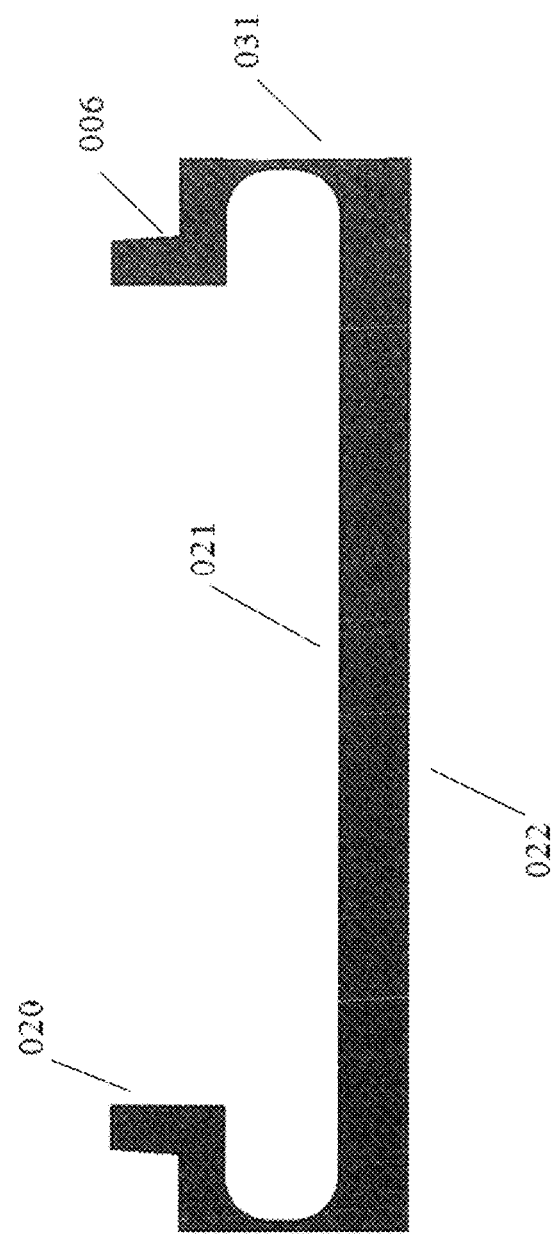
FIG. 3 shows an axi-symmetric image of the base plate.

FIG. 3 shows an axi-symmetric view of the housing base. The male threaded surface 006 is identified there. This threaded surface is a connection to the upper dome housing 001. The loose fit contact surface 020 that the boundary edges of the radial rib panels 009 interface with is identified. The interior floor surface 021 provides a loose fit contact interface with the circular rib tubing 010. Both surfaces 020 and 021 provide an interface between the foot prints of radial panels and circular tube boundary edge surfaces. These interfaces are more at a slip fit where the edge surfaces may come into contact in the event that the assembled present invention is run over by the vehicle. Surface 022 provides contact between the ground and the present invention. The floor thickness is estimated to be ½" depending on the service usage requirement. The sidewall 031 has a wall thickness estimated to be ¹⁄₁₆" depending on the service usage requirement. The fillets shown in FIG. 3 have been estimated to be ¼" depending on service usage requirements. Surface 020 has a vertical length of ¾" while surface 006 has a vertical length of ⅜". The circumference of surface 020 has a diameter of approximately 5" depending on the service usage requirement.

Figure 4:
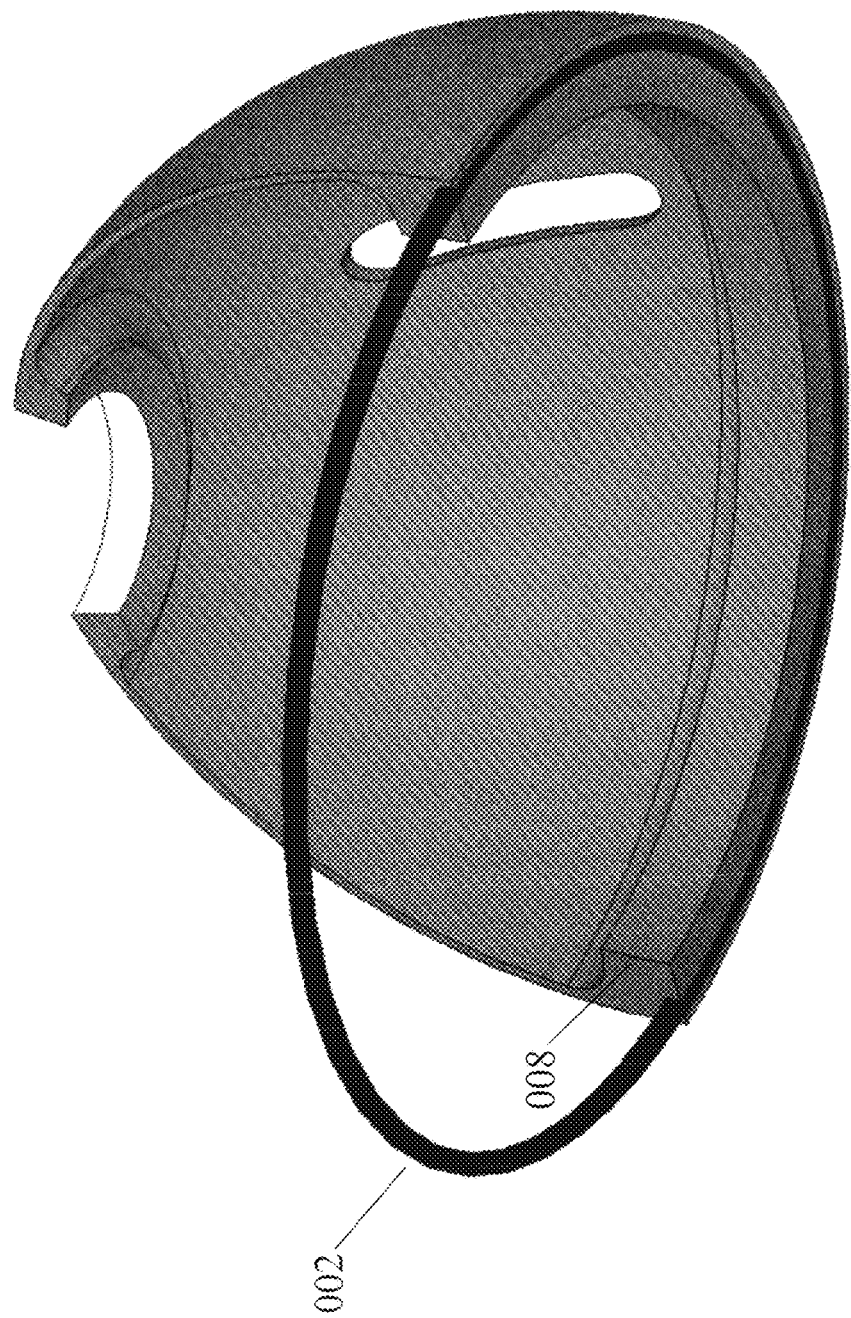
FIG. 4 identifies the o-ring relative to a cutaway of the upper dome housing

FIG. 4 is a cutaway of the upper housing dome looking outboard. The full o-ring seal 002 is exposed over ½ of its circumference. Also, the o-ring 002 and how it substantially seats into the upper housing dome embossment near the equator 030 is shown. The surface with a female threaded connection 008 is identified as well. Threaded connections on surfaces 006 and 008 are compatible at the corresponding interface. The wall thickness of the upper housing dome 001, excluding the material embossment surrounding the material cutouts, is estimated to be ¼" depending on the service usage requirement. Now the embossed material substantially surrounding the material cutouts is estimated to have a thickness of ⅜" depending on the service usage requirement.

Figure 5:
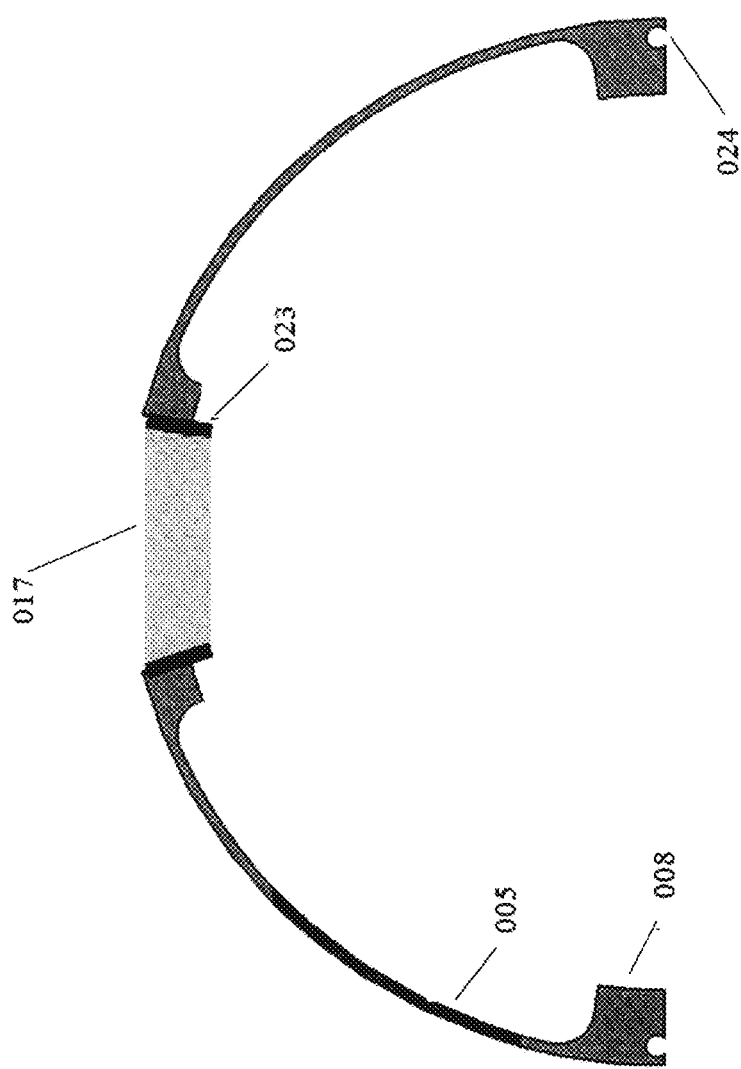
FIG. 5 shows a plane cutting through the upper housing dome while passing through the material cutouts for light passage.

FIG. 5 is a section view of the upper dome housing defined by a cutting plane passing through the antipode and the long axis of the slotted material cutout. The threaded connection 023 between the substantially circular window and the substantially circular material cutout is represented by the heavy black lines. An O-ring and seating design, not shown, is required at the inboard portion of threaded connection 023. A sealed, translucent window 018 is required to fill the slotted material cutout shown. The slot 005 from the material cutout is shown while the substantial material embossment surrounding the slot is not shown. The material cutout forming the O-ring seat 024 at the equator is identified. The embossment at the equator 030 has a wall thickness estimated to be ¼" depending on the service usage requirement. The diameter to the mid-surface of the upper housing dome is estimated to be 6" depending on the service usage requirement. All fillets shown in FIG. 5 are approximately ". The material embossment surrounding the slot 005 is estimated to be ⅜" depending on the service usage requirement. The translucent up-light window 017 has an estimated average diameter of 1.4" with an estimated thickness of 1.25". The O-ring material required at threaded connection 023 will most likely be made out of rubber.

Figure 6B:
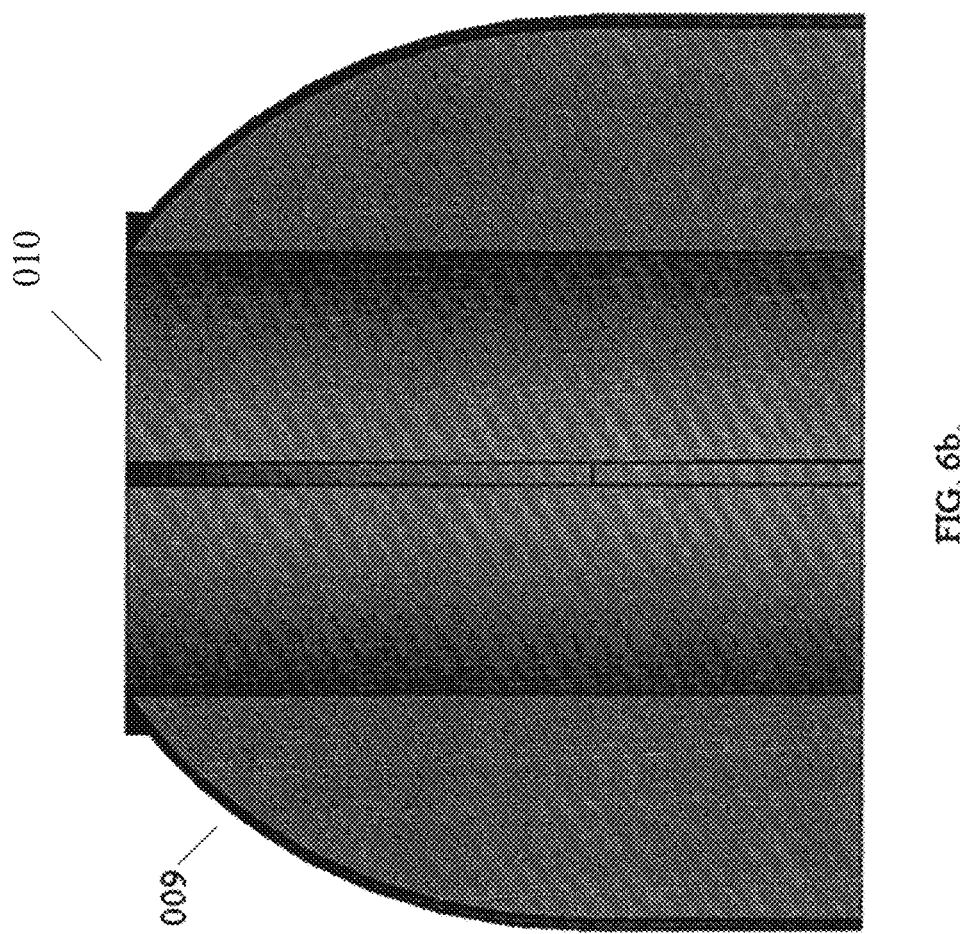
FIG. 6 has 3 windows panes. The left ½ is a isometric view of the internal reinforcement made up of radial panels and a circumferential tube. The top right pane is a side view while the bottom right pane is a top view.

FIG. 6 has three panes which show the representative image of the monocot internal ribbing support. The monocot ribbing is composed of substantially radial panels 009 and a substantially cylindrical tube 010. The left pane is an isometric view of a monocot ribbing support where the six equally spaced radial panels are integral to the circumferential panel—or tube.

The upper right pane is a side view of the internal ribbing while the lower right pane is a top view of the internal ribbing. The outboard edges shown substantially in the top view fit loose into the base 003 and the upper dome 001 housing; it is the surfaces located on these outboard edges which may come into contact with the housing interior in the event that the present invention is run over by the vehicle. The radial rib panels 009 are not limited to the configuration shown in FIG. 6. Mounting features and other such components known to one having ordinary skill in the art—not shown—may be attached to the radial rib panels 009 and/or the circular rib panel 010 to facilitate the fastening, positioning, and seating of the up-light, the laser source, laser transform, the wiring harness, and the rechargeable battery. The rechargeable battery will most likely be a 9 volt.

The lower right pane shows substantially where the rechargeable batteries 011 are stored on the inner most space of the present invention. Material cutouts may be made on the ribs features for the purpose of minimizing material usage while also providing access holes for the electronics of the lighting circuit. The wall thickness of the internal ribbing are estimated to be ¼" depending on the service usage requirement. The material for the internal ribbing 009 and 010 will most likely be aluminum.

Depending on material choice, the rib assembly may be welded, cast, or fitted into the dome housing 001 and/or base housing 003.

Figure 7:
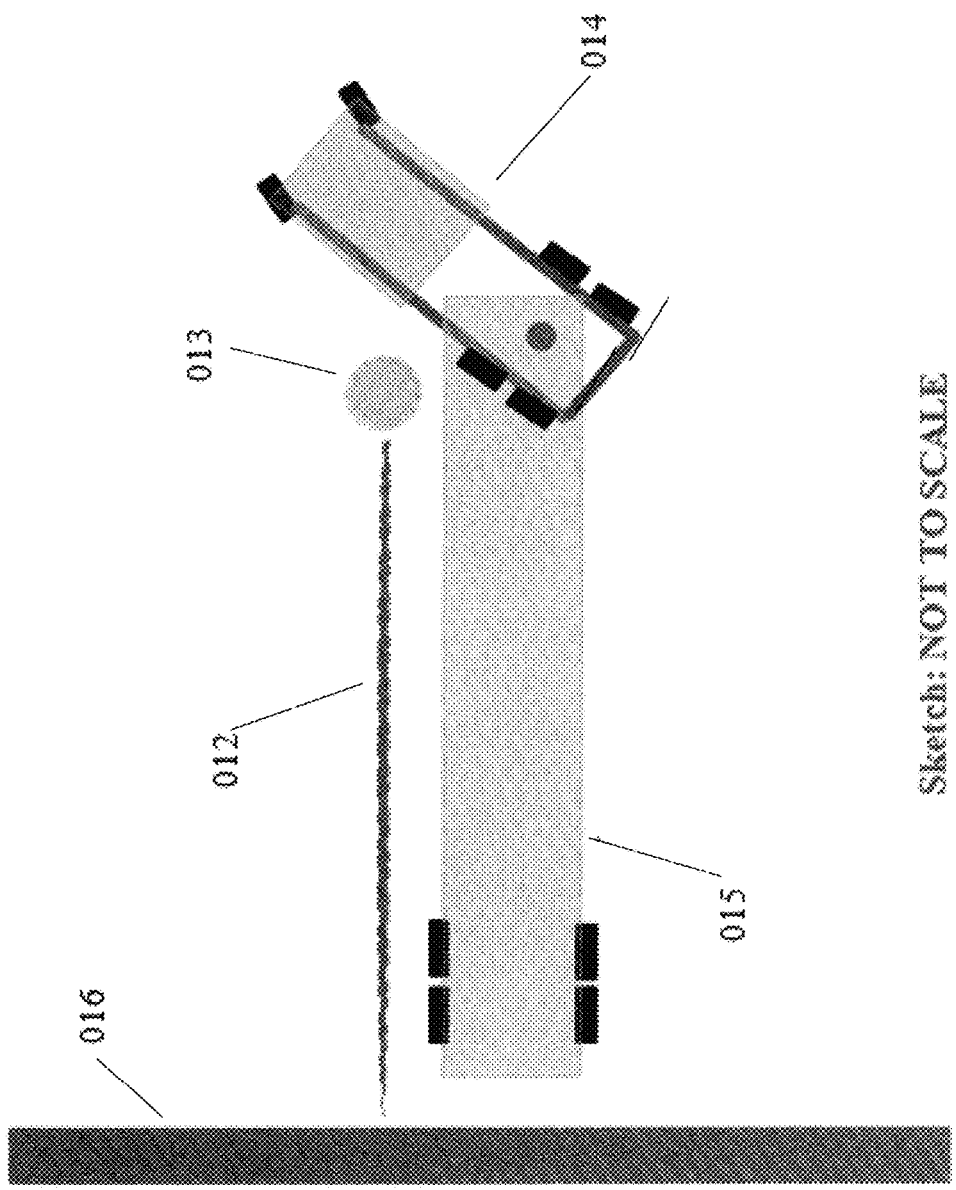
FIG. 7 is a top view sketch of a properly parked or docked articulate vehicle. The sketch is not to scale.

FIG. 7 is from an overhead perspective. A properly docked or parked tractor trailer is show there. The dock 016, the laser plane 012 emitted from the marker light 013, the tractor 014 and trailer 015 are arranged to provide an example of optimally parking or docking an articulate vehicle. While not being limited thereto, a marker light may be disposed in a location to facilitate optimal parking or docking of a vehicle, including, but not limited to, a trailer piloted by a truck. In this example, the marker light is placed such that it substantially locates the optimum pivot location required for docking or parking the vehicle properly. The trailer 015 is shown to be substantially parallel to the narrow laser line 012. In this example, the marker light may be placed so an emission of a nearly or substantially planar laser wall is perpendicular to a dock 016. As a result, the trailer in this example may be optimally parked or docked such that the length of the trailer is parallel to the laser wall.

Figure 8:
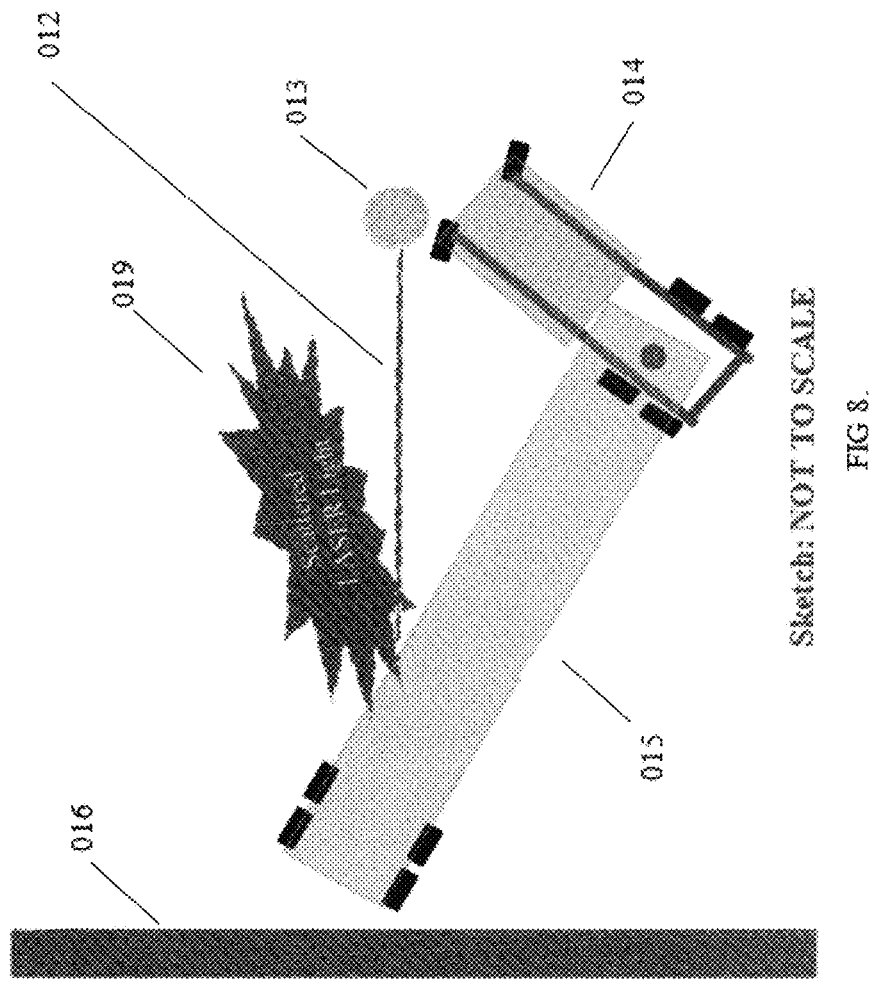
FIG. 8 top view sketch of a failed attempt at docking or parking the articulate vehicle. The sketch is not to scale.

As another example, as is illustrated in FIG. 8 the marker light may serve to indicate when a vehicle, such as a trailer piloted by a truck, is not being parked or docked correctly. Similar to FIG. 7, the dock 016, the laser plane 012 emitted from the marker light 013, the tractor 014 and trailer 015 are shown; however, the items are they're arranged such that the trailer pierces through the laser plane 012 emanating from the marker light 013 causing the laser light from the laser plane to scatter 019. In this example, the marker light may serve to indicate when a vehicle, such as a trailer piloted by a truck, is not being parked or docked correctly. From an overhead perspective, the marker light operates in the same fashion as was described with respect to the example illustrated in FIG. 7. However, in this example, the trailer has not been pivoted around the marker light properly. Furthermore, the length of the trailer is not disposed in a position parallel to the laser wall. In fact, the laser wall in this example intersects and is scattered onto a side of the length of the trailer.

When the laser wall is scattered in this fashion, it is an indication to the driver of the truck that the trailer may have been over-articulated about the marker light, and therefore is not being parked or docked properly. As a result, the driver of the truck may first stop the movement of both the truck and the trailer using the brakes of the truck. Then, the driver of the truck may attempt to adjust the position of the trailer by piloting the truck such that the length of the trailer is placed in a position parallel to the laser wall with the trailer being pivoted to an appropriate (lesser) degree around the bright light emitted from the marker light.

Figure 9:
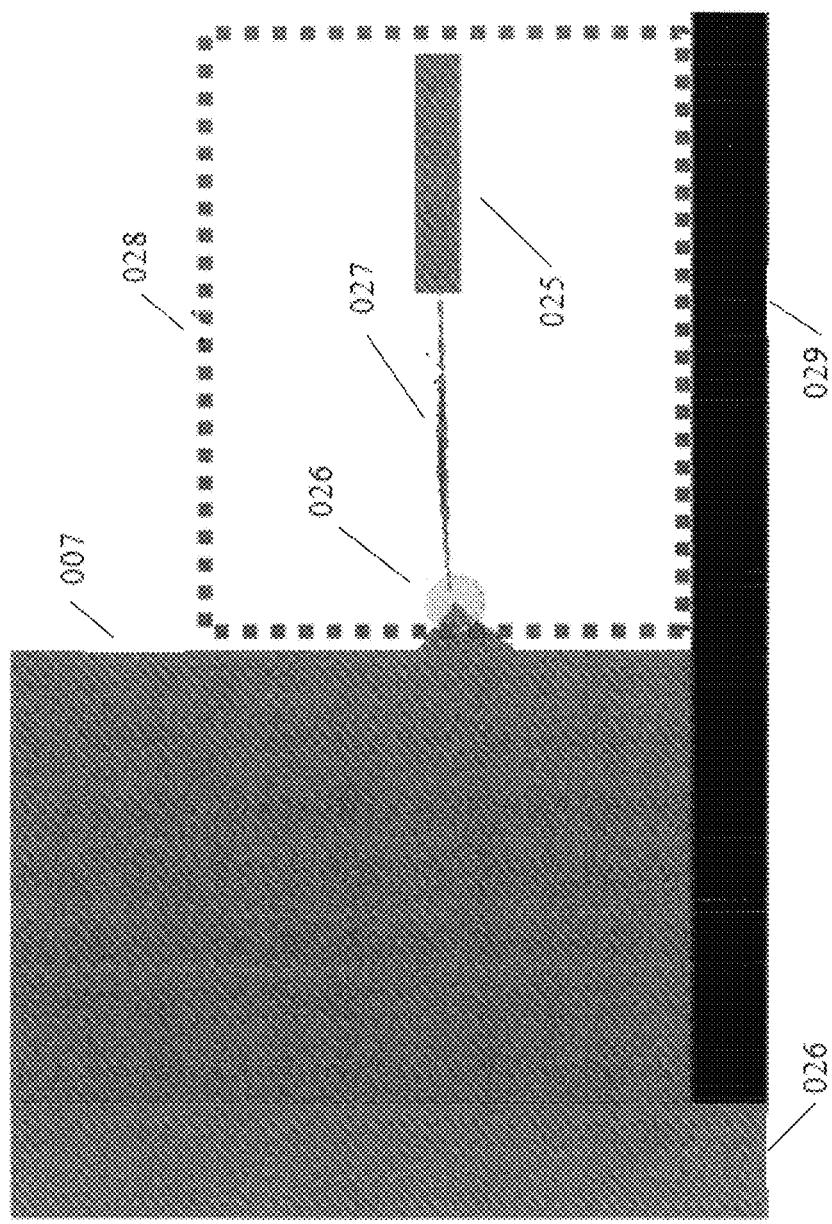
FIG. 9 is an elevation image of the marker light system.

FIG. 9 is an elevation view of the laser plane system where the essence of the laser plane function is illustrated. The objects in this view are not to scale. The relative positions between the objects are also not to scale. The images shown represent the laser source 025, the laser beam 027, the laser transform 026, the representative marker boundary 028, the laser plane 007, the ground 029, and the dock 016 along the vertical. For the purpose of illustration, both surfaces of the ground 029 and the dock 016 wall are idealized as perfectly flat; however, the physical shape that surfaces 029 and 016 represent are expected to be substantially irregular. Due to the irregularity of surfaces 029 and 016 laser line occur where the substantial laser plane 007 impinges on the irregular surfaces of the ground 029 and the vertical dock wall 016. The laser line 012 impinging on the ground, from the marker light to the foot of the vertical dock wall, is oriented such that it provides a target reference for parallel parking or docking the trailer. The laser line impinging on the vertical dock 016 wall from the foot of the vertical dock 016 wall to at least the height of the top of the trailer is oriented on the vertical dock 016 wall such that it forms a perpendicular from the marker light to the dock 016 wall substantially. The laser 027 will most likely have these characteristics: 635 nanometer wavelength, a 5 milliwatt power level, and red color, or other similar characteristics known to one having ordinary skill in the art.

DRAWING REFERENCE NUMBERS

001 Marker Light Housing Dome
002 Rubber Seal O-Ring
003 Marker Light Housing Base
004 Circular Cutout For Vertical Up Light Passageway
005 Slotted Cutout For Laser Sheet
006 Threaded Surface Male Side
007 Representative Laser Sheet
008 Threaded Surface Female Side
009 Radial Rib Panel
010 Circular Rib Panel
011 Space Allotted For Rechargeable Battery Pack
012 Narrow Laser Line Formed by Laser Light Sheet Impingement on Ground
013 Marker Light At Pivot Location
014 Tractor Articulated Around Marker
015 Trailer Properly Docked or Parked
016 Dock
017 Translucent Up Light
018 Translucent Slotted Window
019 Scattered Laser Light
020 Contact Surface Target For Internal Ribbing Footprint
021 Interior Floor Surface of Housing Base
022 Exterior Floor Surface of Housing Base
023 Threaded Connection Between Upper Dome and Translucent Window
024 Notch Cutout for O-Ring Seating
025 Laser Beam Source
026 Transformer Lens
027 Laser Beam Prior To Passing Through The Transform Lens
028 Representative Marker Boundary
029 Ground
030 Housing Equator
031 Housing Base Exterior Wall

The invention claimed is:

1. A lighting device to assist in the parking of a vehicle, comprising:

a partial spherical shell having an opening at the top and a vertical slot wherein the vertical slot is located near the opening and extends towards the base of the partial spherical shell;

a translucent window having a size substantially similar as the opening and integrated with the opening to form a first hermetic seal;

a translucent slot window having a size substantially similar as the vertical slot and integrated with the vertical slot to form a second hermetic seal;

a light source within the partial spherical shell wherein the light source projects a beam through the translucent window; and a laser light source within the partial spherical shell wherein the laser light source projects a laser plane through the translucent slot window.

2. The lighting device in claim 1, further including rubber seals between the opening and the translucent window and between the vertical slot and the vertical slot window.

3. The lighting device in claim 1, further comprising a base attached to the base of the partial spherical shell to form an enclosure.

4. The lighting device in claim 3, further comprising an o-ring between the partial spherical shell and the base, wherein the enclosure is hermetically sealed.

5. The lighting device in claim 3, wherein the partial spherical shell and/or base is formed from the group consisting of: aluminum alloys, thermal set plastics, and composites, and wherein the aluminum is cast or sheet stamped, thermal set plastics include injection molding.

6. The lighting device in claim 3, further comprising an on/off switch, a power source, and charging circuitry within the enclosure.

7. The lighting device in claim 3, further comprising an inner support within the enclosure, having a cylindrical structure and a plurality of radial ribs extending from the external surface of the cylindrical structure wherein the plurality of ribs and the cylindrical structure provide structural support to the enclosure.

8. The lighting devise of claim 1, further comprising local embossments integrated onto the perimeter of the opening, the vertical slot, and the base of the partial spherical shell.

* * * * *